July 29, 1969

J. R. MUNGER 3,457,727

HYBRID ROCKET MOTOR

Filed Jan. 11, 1966

John R. Munger,
INVENTOR.

BY *Harry M. Saragovitz*
*Edward J. Kelly*
*Herbert Berl*
*Harold W. Hilton*

3,457,727
HYBRID ROCKET MOTOR
John R. Munger, Huntsville, Ala., assignor to the United States of America as represented by the Secretary of the Army
Filed Jan. 11, 1966, Ser. No. 520,545
Int. Cl. F02k 9/06
U.S. Cl. 60—251                                                                 5 Claims The invention described herein may be manufactured and used by or for the Government for governmental purposes without the payment of any royalty thereon.

This invention relates to a rocket propulsion system and particularly to a rocket propulsion system utilizing solid fuel and a liquid oxidizer.

Solid-fueled rocket motors possess certain characteristics which tend to render them preferable to liquid-fueled engines, particularly for military application. For example, solid-fueled rocket engines do not require complicated systems of valves, pumps, and tubing to move the propellant constituents from their storage tanks to the combustion chamber.

However, liquid-fueled engines have one very important and distinct advantage over the solid-fueled engines. In a solid propellant grain, the fuel particles and oxidizer are bound together as a single unit. Once the grain has been ignited, combustion continues until the entire grain is consumed. This makes it very difficult to vary the total impulse of the rocket motor. On the other hand, the flow of liquid propellant to the combustion chamber can be readily controlled by valves, variable pump speeds, and the like so that the overall impulse of the engine can be varied. The flow of the propellant can be stopped and then restarted if desired. This characteristic of liquid-fueled engines permits the propelling of missiles at varying distances. For example, a liquid-fueled artillery rocket designed to deliver a warhead up to 250 miles can also deliver the warhead to any reasonable point less than 250 miles simply by controlling the flow rate and total flow of liquid propellant to the combustion chamber. A solid-fueled engine designed to deliver a warhead a specific distance in free flight is limited in its ability to alter this range capability by means other than changing the angle of elevation of the rocket at launch time, which is far from being a completely satisfactory solution to the problem.

It is, therefore, an object of the present invention to provide a solid propellant motor having a liquid oxidizer disposed for injection therein.

It is a further object of the present invention to provide a solid propellant rocket motor having a unique propellant grain configuration which allows for a substantially long "stay time" of the liquid oxidizer therein.

A yet further object of the present invention is to provide a solid propellant rocket motor in which a liquid oxidizer is injected in the rearward portion thereof adjacent the exit nozzle.

Other and further objects and advantages of the present invention will be apparent to one skilled in the art upon studying the following detailed description taken in conjunction with the drawing in which.

Figure 1:
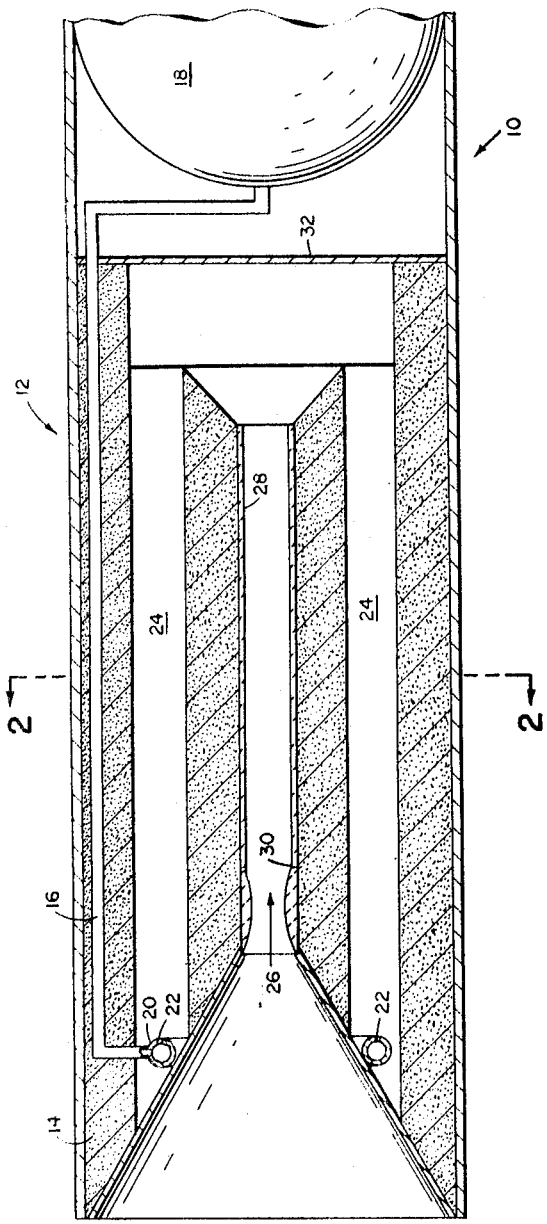
FIGURE 1 is an elevational sectional view of a rocket embodying the principles of my invention.
Figure 2:
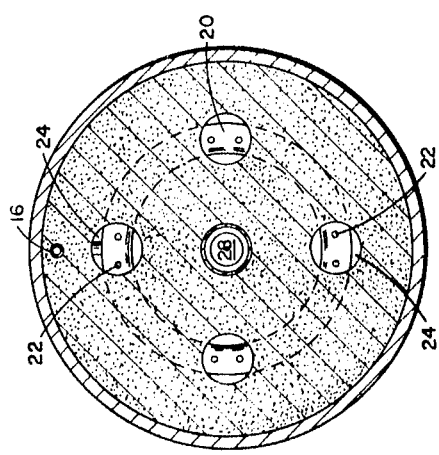
FIGURE 2 is a sectional view taken along line 2—2 of FIGURE 1.

As shown in FIGURE 1, a rocket 10 includes a motor 12 having solid propellant grain 14 therein. A conduit 16 extends, in the grain, to be connected to a source of liquid oxidizer 18.

An annular conduit 20 is connected to conduit 16 and is provided with a plurality of ports 22 through which the liquid oxidizer is injected onto the propellant grain. The propellant grain includes a plurality of longitudinal perforations 24 disposed in an annulus about a central longitudinal perforation 26. A heat resistant liner 28 is disposed in central perforation 26 and extends along the length thereof. A nozzle 28 is mounted in the central perforation adjacent the distal end 30 of liner 28. The nozzle and liner must be of a heat resistant material such as ceramic, insulated steel, carbon, etc. However, these examples are merely illustrative of many other materials which may be used.

The forward end of the motor includes a head 32 which may be flat or dome-shaped as desired. It is only necessary that the head be capable of withstanding the forces to which it is subjected.

In operation, oxidizer is forced from the tank or source of oxidizer 18 through the conduit 16 to the injector ring 20, from which it is injected into the perforations 24. Upon ignition of the propellant, the gaseous products of combustion travel along the perforations 24 to the forward end or head 32 and then rearwardly through the heat resistant liner of central perforation 26, for ejection through nozzle 28 to propel the rocket in its flight.

It is to be understood that while there has been disclosed an embodiment illustrating four perforations formed about a single central perforation, this invention is not limited to the embodiment shown. Obviously, as many perforations as desired may be used, dependent upon the requirements of the particular motor.

The means for forcing the oxidizer to the motor may be a pump, or, if desired, the tank containing the oxidizer may be provided with bladders or pistons which are actuatable to force the oxidizer from the tank to the perforations of the propellant grain. A valve may be mounted in conduit 16 to shut-off flow of oxidizer to the propellant, if desired.

It should be obvious, from the foregoing, that the particular arrangement discussed provides a rocket motor with a configuration that allows achievement of a very high loading density of propellant. It should also be obvious that the provision of injecting the oxidizer into the motor at the rearwardmost portion thereof permits the oxidizer to have a longer stay time in the rocket motor, thus increasing the efficiency of the system. Also, since the conduit through which the oxidizer is supplied to the injector ring, is carried in the propellant grain, the oxidizer is preheated before injection into the propellant grain.

What is claimed is:
1. A rocket having a propulsion unit comprising:
   (a) a combustion chamber;
   (b) a solid body of propellant having a central longitudinal perforation therethrough and a plurality of second longitudinal perforations disposed about said central perforation;
   (c) a source of liquid oxidizer carried by said rocket; and
   (d) an injector mounted in said propellant adjacent the rearwardmost portion of said combustion chamber to receive said oxidizer for injection thereof into said second perforations.

2. A propulsion unit as in claim 1 including:
   (a) a heat resistant liner disposed in said central perforation; and
   (b) a nozzle mounted in said central perforation adjacent the rearwardmost portion of said liner.

3. A propulsion unit as in claim 2 including:
   (a) a conduit extending through the grain of said propellant in communication with said source of oxidizer; and
   (b) said injector communicating with said conduit and arranged in an annulus in said propellant, said injector having a plurality of ports communicating with said second perforations for injection therein of said oxidizer.

4. A propulsion unit as in claim 3 wherein:
(a) the grain of said propellant extends rearwardly of the most rearward end of said liner; and
(b) said nozzle is disposed adjacent the most rearward end of said liner for submerged relation therein with said propellant.

5. A propulsion unit as in claim 4 including four of said second perforations disposed annularly about said central perforation.

References Cited

UNITED STATES PATENTS

| 1,879,579 | 9/1932 | Stolfa et al. | 60—253 |
| 3,166,898 | 1/1965 | Hoeptner | 60—39.47 |
| 3,214,906 | 11/1965 | Coleal | 60—231 |

SAMUEL FEINBERG, Primary Examiner

U.S. Cl. X.R.

60—39.47